US005925173A

United States Patent [19]

Frost et al.

[11] Patent Number: 5,925,173

[45] Date of Patent: Jul. 20, 1999

[54] METHOD OF INHIBITING CORROSION OF FLUX-TREATED METAL SURFACES

[75] Inventors: Richard A. Frost, Holmes, N.Y.; Aleksei V. Gershun, Oakville, Conn.; William C. Mercer, Brookfield, Conn.; Peter M. Woyciesjes, Woodbury, Conn.

[73] Assignee: Prestone Products corporation, Danbury, Conn.

[21] Appl. No.: 08/908,040

[22] Filed: Aug. 11, 1997

[51] Int. Cl.[6] .................. C23F 11/00

[52] U.S. Cl. .................. 106/14.14; 106/14.13; 106/14.41; 106/14.42; 106/14.44; 252/74; 252/76; 252/79

[58] Field of Search .................. 106/14.13, 14.41, 106/14.42, 14.44, 14.14; 252/74, 76, 79

[56] References Cited

U.S. PATENT DOCUMENTS

| | | | |
|---|---|---|---|
| 3,951,328 | 4/1976 | Wallace et al. | 228/207 |
| 3,971,501 | 7/1976 | Cooke | 228/248.1 |
| 4,246,030 | 1/1981 | Lipinski | 106/14.13 |
| 4,382,008 | 5/1983 | Boreland et al. | 252/75 |
| 4,448,702 | 5/1984 | Kaes | 252/70 |
| 4,588,513 | 5/1986 | Triebel et al. | 252/75 |
| 4,647,392 | 3/1987 | Darden et al. | 252/75 |
| 4,657,689 | 4/1987 | Darden | 252/75 |
| 4,759,864 | 7/1988 | Van Neste et al. | 252/75 |
| 4,946,616 | 8/1990 | Falla et al. | 252/75 |
| 5,269,956 | 12/1993 | Miller et al. | 252/67 |
| 5,333,776 | 8/1994 | Garg et al. | 228/219 |
| 5,360,158 | 11/1994 | Conn et al. | 228/56.3 |
| 5,387,360 | 2/1995 | Uekusa et al. | 252/73 |
| 5,413,642 | 5/1995 | Alger | 148/239 |
| 5,422,191 | 6/1995 | Childree | 428/654 |
| 5,507,861 | 4/1996 | Caupin et al. | 106/14.13 |
| 5,718,836 | 2/1998 | Nakatani et al. | 252/74 |
| 5,741,436 | 4/1998 | Gershun et al. | 252/76 |

FOREIGN PATENT DOCUMENTS

| | | |
|---|---|---|
| 77767 | 4/1983 | European Pat. Off. . |
| 251480 | 1/1988 | European Pat. Off. . |
| 479470 A1 | 4/1992 | European Pat. Off. . |
| 534692 | 3/1993 | European Pat. Off. . |
| 552988 | 7/1993 | European Pat. Off. . |
| 19605509 | 8/1997 | Germany . |
| WO-97/20901 | 6/1997 | WIPO . |

OTHER PUBLICATIONS

The Aluminum Association, "Base Metals, Brazing Filler Metals and Fluxes," *Aluminum Brazing Handbook,* ch. 3, pp. 24–32 (Jan. 1990).

Ando et al., "Development of Aluminum Radiators Using the Nocolok Brazing Process—Corrosion Resistance of New Aluminum Radiators by Applying a Nocolok Brazing Process," SAE Technical Paper No. 870180 (Feb. 1987).

American Welding Society, *Brazing Handbook,* ch. 4, pp. 69–97 (4th ed. 1991) no month.

D.L. Childree, "A New Al–Si–Li Filler Metal that Enhances Brazeability of High–Strength Alloys in CAB and Vacuum," SAE Int'l SP–1175, Technical Paper No. 960247, pp. 17–25 (1996) no month.

Chrysler Corporation Engineering Standards, "Engine Coolant—Glycol Type–Inhibited–Production and Service Use Part No. 4698542," Standard No. MS–9769 (Jun. 1995).

Chycu et al., "The Effect of Nitrogen on the Corrosion of Plasma–Nitrided 4140 Steel," *Corrosion,* 47(1), pp. 31–34 (1991) no month.

Claydon et al., "Brazing Aluminum Automotive Heat Exchanger Assemblies Using a Non–Corrosive Flux Process," SAE Technical Paper No. 830021 (Feb. 1983).

Cooke et al., "Furnace Brazing of Aluminum with a Non–Corrosive Flux," SAE Technical Paper No. 780300 2(1978).

Darden et al., "Monobasic/Diacid Combination as Corrosion Inhibitors in Antifreeze Formulations," *Worldwide Trends in Engine Coolants, Cooling System Materials and Testing,* SAE Int'l SP–811, Paper #900804, pp. 135–151 (1990).

Field et al., "Mechanistic Aspects of the Nocolok Flux Brazing Process," SAE Technical Paper No. 870186 (Feb. 1987).

Ford Engineering Material Specifications, "Coolant, Organic Additive Technology, Concentrate," Specification No. WSS–M97B44–C (1995) no month.

Ford Motor Company, Ford Laboratory Test Method (FLTM) BL 5–1 (Feb. 1981).

Fortin et al., "Aluminum Materials and Processes for Aluminum Heat Exchanger Applications," SAE Technical Paper No. 852228, pp. 425–436 (1985) no month.

General Motors Engineering Standards, "Long–Life Automotive Engine Coolant Antifreeze Concentrate–Ethylene Glycol," Specification No. GM6277M (1995) no month.

Hagiwara et al., "Development of Corrosion Resistant Aluminum Heat Exchanger, Part 1: Development of New Aluminum Alloy Sheets for Sacrificial Anode," SAE Technical Paper No. 860080 (Feb. 1986).

Stanley T. Hirozawa, "Galvanostaircase Polarization: A Powerful Technique for the Investigation of Localized Corrosion," Abstract No. 48, presented at the Electrochemical Society Meeting, pp. 81–82 (1982) no month.

(List continued on next page.)

*Primary Examiner*—Anthony Green
*Attorney, Agent, or Firm*—Fish & Neave

[57] ABSTRACT

This invention relates to a method of inhibiting the corrosion of flux-treated metal surfaces. The method comprises the step of contacting the flux-treated metal surface with a formulation comprising a corrosion inhibitor composition comprising one or more mono-carboxylic acids, or salts or isomers thereof, and an effective amount of a corrosion inhibiting surface active agent such as a water soluble alkali or alkaline earth metal nitrate salt. This method has been demonstrated to be a surprisingly effective means to inhibit corrosion of flux-treated metal surfaces found in the cooling systems of internal combustion engines.

13 Claims, No Drawings

OTHER PUBLICATIONS

Johnny Liu, "Nocolok Flux and Aluminum Brazing," SAE Int'l SP–1175, Technical Paper No. 960244 (1996) no month.

Liu et al., "Nocolok Brazing Aluminum Heat Exchangers," SAE Technical Paper No. 950117, pp. 95–99 (Feb. 1995).

Park et al., "New Vacuum Brazed Aluminum Radiators for Ford Light Trucks," SAE Technical Paper No. 860078 (Feb. 1986).

Sridhar et al., "Applicability of Repassivation Potential for Long Term Prediction of Localized Corrosion of Alloy 825 and Type 316L Stainless Steel," *Corrosion*, 49(11), pp. 885–894 (1993) no month.

Truhan et al., "Effect Of Nitrate Concentration on Passivation of Aluminum Alloys in Commercial Coolants for Heavy Duty Diesel Engines," SAE Technical Paper 900436 (Feb. 1990).

"Vital Signs," *Ward's Auto World,* p. 22 (Sep. 1996).

Wiggle et al., "The Effectiveness of Engine Coolant Inhibitors for Aluminum," *Corrosion 80,* National Association of Corrosion Engineering Conference, Technical Paper 69 (Mar. 1980).

Wiggle et al., "A Rapid Method to Predict the Effectiveness of Inhibited Engine Coolants in Aluminum Heat Exchangers," SAE Technical Paper 800800 (Jun. 1980).

Winter et al., "The Story Behind the Numbers," *Ward's 1996 Automotive Yearbook,* pp. 24–30 (58th ed. 1996) no month.

METHOD OF INHIBITING CORROSION OF FLUX-TREATED METAL SURFACES

FIELD OF THE INVENTION

The present invention relates generally to a method of inhibiting corrosion of flux-treated metal surfaces. More particularly, the present invention relates to the use of an organic acid corrosion inhibitor composition comprising a surface active agent to provide prolonged protection to flux-treated metal surfaces typically found in industrial and commercial heat exchangers, such as those in internal combustion engines.

BACKGROUND OF THE INVENTION

Corrosion has long been a problem when certain metals or alloys are used in applications in which they come into contact with an aqueous medium. For example, in heat-transfer systems, such as those found in internal combustion engines, alcohol-based heat transfer fluids (i.e., antifreezes) can be very corrosive to the metal surfaces of the heat-transfer systems. Compounding this problem is that the corrosion is accelerated under normal engine operating conditions (i.e., high temperatures and pressures). Corrosion inhibitors have been used to address these problems by protecting the metal surfaces in industrial and commercial heating and/or cooling systems such as heat exchangers used in the automotive industry (e.g., radiators which control engine operating temperatures, condensers and evaporators in air conditioning systems, and heater cores which provide heat to passenger compartments).

Heat exchangers for cars and light trucks have traditionally been constructed of soldered brass. More recently, however, in order to meet new environmental standards mandating improved fuel economy and reduced emissions, automotive manufacturers have begun using more lightweight metals (e.g., aluminum). See, e.g., *Ward's Auto World*, p.22 (September, 1996); *Ward's* 1996 *Automotive Yearbook*, p.27 (58th ed. 1996). Accordingly, heat exchangers in cars and light duty trucks are now being constructed using aluminum components. Typical aluminum components in heat exchangers include the tubes through which the coolant passes and in which the heat exchange occurs, the fins that are between the tubes to transfer heat from the tubes to the outside air, the header plates that hold the tubes and fins in place, and, in the case of heater cores, the end tanks that transfer the fluid between the tubes and the engine. See, e.g., Fortin et al., "Aluminum Materials and Processes for Aluminum Heat Exchanger Applications," SAE Technical Paper No. 852228 (1985). However, aluminum surfaces are particularly susceptible to corrosion. See, Darden et al., "Monobasic/Diacid Combination as Corrosion Inhibitors in Antifreeze Formulations," *Worldwide Trends in Engine Coolants, Cooling System Materials and Testing*, SAE Int'l SP-811, Paper #900804, pp. 135–51 (1990) ("SAE SP-811").

During the assembly of automotive heat exchangers, the aluminum components are typically joined together by a brazing process which generally involves joining these aluminum-containing components with a brazing alloy (i.e., an aluminum alloy with a melting point substantially lower than that of the components to be joined). The aluminum components to be joined are "brazed" by holding them together in a jig with the brazing alloy adjacent to or between these components, then heating them in a furnace to a temperature that will melt the brazing alloy without melting the components. The brazing process is described in "Base Metals, Brazing Filler Metals and Fluxes," *Aluminum Brazing Handbook*, p. 24 (January 1990).

One of the problems with brazing aluminum is that aluminum is prone to oxidation. Aluminum oxidation is promoted by high temperatures and the presence of oxygen and water vapor and can reduce the strength and durability of a brazed joint. One brazing method which avoids this problem is the controlled atmosphere brazing ("CAB") process. The CAB process generally involves pre-assembly of the aluminum components in a jig, spraying of the pre-assembled components with a flux, and then followed by introduction into an inert and controlled atmosphere brazing oven. The CAB process is the preferred brazing method, as compared to other brazing methods that also avoid aluminum oxide formation (e.g., vacuum brazing), because it is cost effective and generally produces higher quality heat exchangers with reduced scrap rates. The CAB process is described in U.S. Pat. Nos. 5,422,191; 5,360,158; 5,333,777; 3,971,501 and 3,951,328; Cooke et al., "Furnace Brazing of Aluminum with a Non-Corrosive Flux," SAE Technical Paper No. 780300 (1978); Claydon et al., "Brazing Aluminum Automotive Heat Exchanger Assemblies Using a Non-Corrosive Flux Process," SAE Technical Paper No. 830021 (1983); D. L. Childree,"A New Al—Si—Li Filler Metal that Enhances Brazeability of High-Strength Alloys in CAB and Vacuum," SAE Int'l SP-1175, Technical Paper No. 9602447 (1996); *Brazing Handbook*, American Welding Society (1991).

In the CAB process, the flux, which typically consists of alkali metal or alkaline earth metal fluorides or chlorides, serves a number of important functions. These include removing the aluminum oxide coating present on the exposed metal and brazing alloy surfaces, preventing reformation of the aluminum oxide layer during brazing, and enhancing the flow of the brazing alloy.

It has been found that the use of this flux in heat exchangers assembled by the CAB process results in residual flux on the surfaces of the aluminum components. The aluminum surfaces that generally are exposed to the flux residue include the inside of the heat exchanger tubes, i.e., radiator and/or heater core. However, because the commonly-used fluoride-based fluxes are considered non-corrosive to aluminum, the presence of residual flux per se has not been considered a problem.

Aluminum heat exchangers manufactured by the CAB process, and thus containing flux-treated aluminum surfaces, are fairly common in automotive and light truck applications and are currently in use by at least one major heat exchanger manufacturer. Ando et al., "Development of Aluminum Radiators Using the Nocolok Brazing Process—Corrosion Resistance of New Aluminum Radiators by Applying a Nocolok Brazing Process," SAE Technical Paper No. 870180 (1987); Park et al., "New Vacuum Brazed Aluminum Radiators for Ford Light Trucks," SAE Technical Paper No. 860078 (1986). There have been no reported problems associated with corrosion of these heat exchangers when used with antifreeze formulations containing conventional corrosion inhibitors such as triazoles, thiazoles, borates, silicates, phosphates, benzoates, nitrates, nitrites and molybdates. However, such conventional corrosion inhibitors may have problems in some applications, including expense and inadequate long-term protection. See U.S. Pat. No. 4,946,616, col. 1, lines 31–45; U.S. Pat. No. 4,588,513, col. 1, lines 55–64; SAE SP-811, pp. 137–38. Accordingly, automobile manufacturers have begun using, and several now require, organic acid based (or extended life) corrosion inhibitors. A number of organic acid corrosion inhibitors have been described. See, e.g., U.S. Pat. Nos. 4,382,008, 4,448,702 and 4,946,616; see also, U.S. patent application Ser. No. 08/567,639, (U.S. Pat. No. 5,741,436) incorporated herein by reference.

However, several formulations comprising mono-carboxylic acid(s), even those previously demonstrated to be effective aluminum corrosion inhibitors, have been unable to adequately protect CAB manufactured (i.e., flux-treated) aluminum surfaces. Further, while several aluminum corrosion inhibitors are known, many of these corrosion inhibitors are undesirable or unacceptable for the organic acid based antifreeze formulations used today. For example, phosphate salts, known to inhibit aluminum corrosion, are unacceptable because they have been prohibited for use in organic acid formulations by a number of original equipment automotive manufacturers. See, e.g., General Motors Engineering Standards, "Long-Life Automotive Engine Coolant Antifreeze Concentrate—Ethylene Glycol," Specification No. GM 6277M; Ford Engineering Material Specifications, "Coolant, Organic Additive Technology, Concentrate," Specification No. WSS-M97B44-C; Chrysler Corporation Engineering Standards, "Engine Coolant—Glycol Type—Inhibitied—Production and Service Use," Standard No. MS-9769. Similarly, sodium silicate, also a known aluminum corrosion inhibitor, is prohibited by General Motors and Ford. Moreover, sodium nitrate, known to effectively prevent aluminum pitting corrosion in conventional coolant formulations, has been reported to be much less effective in preventing pitting-corrosion than organic acid based inhibitors. See U.S. Pat. No. 4,647,392, col. 12.

Accordingly, there remains a need for a method using mono-carboxylic acid-based corrosion inhibitors to protect flux-treated metal surfaces, especially those found in automotive heat exchangers.

SUMMARY OF THE INVENTION

The present invention provides a method of inhibiting the corrosion of flux-treated metal surfaces. The inventive method comprises the step of contacting the flux-treated metal surface with a formulation comprising a corrosion inhibitor composition comprising one or more mono-carboxylic acids, or salts or isomers thereof, and a corrosion inhibiting surface active agent.

The mono-carboxylic acid used in the corrosion inhibitor composition may be selected from the group consisting of saturated and unsaturated aliphatic, and aromatic, mono-carboxylic acids, and inorganic and organic salts and isomers thereof, and any combination thereof. The corrosion-inhibiting surface active agent may be any organic or inorganic nitrate salt including water soluble alkali or alkaline earth metal nitrate salts.

The method of this invention has been demonstrated to be a surprisingly effective means to inhibit corrosion of flux-treated metal surfaces found in the cooling systems of internal combustion engines. For this application, the aqueous medium used is an antifreeze coolant formulation comprising a liquid alcohol freezing point depressant, from about 0.1% to about 5.5% by weight of the corrosion inhibitor composition, and from about 10% to about 90% by weight water.

DETAILED DESCRIPTION OF THE INVENTION

In order that the invention herein described may be more fully understood, the following detailed description is set forth.

The present invention provides an effective low cost method for inhibiting corrosion of flux-treated metal surfaces (e.g., aluminum or aluminum alloys used in the CAB process) that are in contact with aqueous systems. The inventive method comprises the step of contacting the flux-treated metal surface with a formulation comprising a corrosion inhibitor composition comprising one or more mono-carboxylic acids, or salts or isomers thereof, and an effective amount of a corrosion inhibiting surface active agent.

The corrosion-inhibiting surface active agent may be any organic or inorganic nitrate salt including water soluble alkali or alkaline earth metal nitrate salts. Examples of such nitrate salts include sodium, potassium, calcium, magnesium and lithium salts. Ammonium and amine salts of these compounds may also be used. The preferred surface active agents are alkali metal nitrate salts, and more preferred is sodium nitrate (i.e., $NaNO_3$).

The mono-carboxylic acid used in the corrosion inhibitor composition may be selected from the group consisting of saturated and unsaturated aliphatic, and aromatic, mono-carboxylic acids, and inorganic and organic salts and isomers thereof, and combinations thereof. Preferred mono-carboxylic acids include $C_4$–$C_{12}$ mono-carboxylic acids, or inorganic or organic salts or isomers thereof, or combinations thereof. The more preferred mono-carboxylic acids include mixtures having a major amount of a $C_8$ mono-carboxylic acid component (e.g., neo-octanoic acid and/or 2-ethyl hexanoic acid, more preferably 2-ethyl hexanoic acid) and neo-decanoic acid. Where the mixture of a $C_8$ mono-carboxylic acid component and neo-decanoic acid is used, the preferred mixture comprises the $C_8$ mono-carboxylic acid component and neo-decanoic acid in the weight ratio of about 3:1. See U.S. patent application Ser. No. 08/567,639 (U.S. Pat. No. 5,741,436).

The present method may be used in a number of corrosion-inhibiting applications, including, but not limited to, antifreeze formulations used in the cooling systems of internal combustion engines of automobiles and/or trucks, stationary engines, engines used in off-road equipment and heat transfer agents for central heating circuits. One preferred application of this method is to inhibit corrosion of the flux-treated surfaces of automobile and/or truck heat exchangers that were prepared by the CAB process. Such heat exchangers are typically treated with fluoride-based fluxes, such as mixtures of $K_3AlF_6$, $K_2AlF_5$ and $KAlF_4$. Fluoride-based fluxes are generally preferred over chloride-based fluxes for brazing aluminum or aluminum alloys because they (1) are nonhydroscopic and substantially water insoluble after brazing, (2) leave a water insoluble residue after brazing, and (3) are inert or non-corrosive with respect to aluminum or aluminum alloys at brazing temperature. Such fluoride-based fluxes are readily available from, for example, Aluminum Company of Canada, Ltd. ("Alcan") and Solvay Performance Chemicals under the trademark NOCOLOK®. See Johnny Liu, "NOCOLOK Flux and Aluminum Brazing," SAE Int'l SP-1175, Technical Paper No. 960244 (1996); Field et al., "Mechanistic Aspects of the NOCOLOK Flux Brazing Process," SAE Technical Paper No. 870186 (1987); Liu et al., "NOCOLOK Brazing Aluminum Heat Exchangers," SAE Technical Paper No. 950117 (1995).

When the present invention is to be used to protect automotive heat exchangers, the aqueous media (e.g., antifreeze coolant concentrates and/or formulations) typically comprise a liquid alcohol which functions as a freezing point depressant, a corrosion inhibitor composition comprising a surface active agent and water.

Suitable liquid alcohols which function as freezing point depressants include any alcohol or other heat transfer medium and preferably is at least one alcohol, selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols (such as methoxyethanol) and mixtures thereof. The preferred alcohol is selected from the group consisting of ethylene glycol, diethylene glycol, propylene glycol, dipropylene glycol and mixtures thereof.

The corrosion inhibitor composition comprises a corrosion-inhibiting surface active agent and one or more mono-carboxylic acids, or salts or isomers thereof as described above.

More preferably, the carboxylic acid comprises a mixture of a major amount of a $C_8$ mono-carboxylic acid component (e.g., neo-octanoic acid and/or 2-ethyl hexanoic acid, more preferably 2-ethyl hexanoic acid) and neo-decanoic acid. Where the mixture of a $C_8$ mono-carboxylic acid component and neo-decanoic acid is used, the preferred mixture comprises the $C_8$ mono-carboxylic acid component and neo-decanoic acid in the weight ratio of about 3:1 (e.g., from about 2.4% to about 3.3% (by weight of the antifreeze coolant concentrate) of the $C_8$ mono-carboxylic acid component, more preferably about 3.1%, and from about 0.8% to about 1.1% (by weight of the antifreeze coolant concentrate) of neo-decanoic acid, more preferably about 1.0%). See U.S. patent application Ser. No. 08/567,639 (U.S. Pat. No. 5,741,436).

The preferred corrosion-inhibiting surface active agents are alkali metal nitrate salts, and more preferred is sodium nitrate. The surface active agent is present in the antifreeze formulation in an amount from about 50 ppm to about 5000 ppm. The corrosion inhibitor composition is typically added in an amount sufficient such that from about 0.1% to about 5.5% (by weight) of the corrosion inhibitor composition is present in the antifreeze formulation.

The corrosion inhibitor composition may also include between about 0.01% and about 1.0% (by weight of the total antifreeze formulation) of one or more alkali, alkaline earth metal, ammonium or amine salts of nitrite. Additionally, the corrosion inhibitor composition may also include one or more inorganic and/or organic corrosion inhibitors, such as di-carboxylic acids, triazoles, thiazoles, phosphates, borates, silicates, molybdates or the alkali metal, alkaline earth metal, ammonium or amine salts thereof. Such additional corrosion inhibitors may be added in concentrations of up to about 5.5% (by weight of the total antifreeze formulation). The preferred corrosion inhibitor composition used in this invention further comprises a triazole or thiazole, more preferably, an aromatic triazole or thiazole such as benzotriazole, mercaptobenzothiazole or tolyltriazole ("TTZ") and most preferably, TTZ.

The aqueous formulation may also comprise a sufficient amount of an alkali metal hydroxide to adjust the pH to between about 6.0 to about 9.5, preferably to about 6.5 to about 9.0. Other additives may also be used depending on the application. Suitable additives include anti-foaming agents (e.g., "PM-5150" from Union Carbide Corp., "SAG-2001" and "Silweet L-7220" from Witco Chemical Co., "Y-3D" and DC-Q2-5067" from Dow Corning, "Pluronic L-61" from BASF Corp., "PI 35/50" from Ultra Additive, and "Patco 492" or "Patco 415" from American Ingredients Company), dyes (e.g., "Alizarine Green," "Uranine Yellow" or "Green AGS-liquid" from Abbey Color Inc., "Orange II (Acid Orange 7)" or "Intracid Rhodamine WT (Acid Red 388)" from Crompton & Knowles Corp.), pH buffers, scale inhibitors, and/or sequestration and dispersion agents (e.g., "Dequest" from Monsanto Chemical Company, "Bayhibit" from Miles Inc., "Nalco" or "NalPREP" from Nalco Chemical Company).

Where the aqueous media is an antifreeze formulation for internal combustion engines, the formulation is usually diluted with water such that between about 10% to about 90% (by weight) water is present, and preferably from about 25% to about 75% (by weight) water, with the balance being the antifreeze coolant concentrate (i.e., the liquid alcohol freezing point depressant, corrosion inhibitors, surface active agents, and other additives).

It will be appreciated by one of skill in the art that the amounts of the various components (e.g., corrosion inhibitor composition) in a specific formulation to be used in the inventive method, may vary when minor adjustments are made to the other components of the formulations.

In order that this invention may be better understood, the following examples are set forth. These examples are for the purpose of illustration only and are not to be construed as limiting the scope of the invention in any way.

EXAMPLES

To evaluate the effectiveness of the corrosion inhibitors tested, each formulation was subjected to the Ford Galvanostatic Pitting Potential Test. See Ford Motor Company, Ford Laboratory Test Method (FLTM) BL 5-1, incorporated herein by reference. This test offers a fast, reliable method for evaluating corrosion of heat exchanger components. More specifically, the Ford Galvanostatic Pitting Potential Test is a standard electrochemical technique developed at Ford Motor Company and is used to evaluate the ability of corrosion inhibitors in antifreeze formulations to inhibit pitting corrosion of aluminum and aluminum-containing alloys.

This test provides a measure of how well the antifreeze formulation inhibits the breakdown of the protective oxide film and subsequent pit formation on the metal sample, and also provides a measure of how well the antifreeze formulation repassivates the surface once initial pit formation has begun. The Ford Galvanostatic Pitting Potential Test measures the repassivation potential ("Erep") of aluminum alloys in ian engine coolant. According to the Ford Specification, higher repassivation potential values demonstrate better inhibition of aluminum or aluminum alloy corrosion in the heat exchanger environment. The minimum acceptable Erep is −400 mV.

The use of such electrochemical procedures is well known. See, e.g., "The Effectiveness of Engine Coolant Inhibitors for Aluminum, Technical Paper 69 Corrosion 80, National Association of Corrosion Engineering Conference (1980); "A Rapid Method to Predict the Effectiveness of Inhibited Engine Coolants in Aluminum Heat Exchangers," SAE Technical Paper 800800 (1980); "Effect Of Nitrate Concentration on Passivation of Aluminum Alloys in Commercial Coolants for Heavy Duty Diesel Engines," SAE Technical Paper 900436 (1986); "Galvanostaircase Polarization: A Powerful Technique for the Investigation of Localized Corrosion," Technical Paper 48, presented at the Electrochemical Society Meeting (1982); "Applicability of Repassivation Potential for Long Term Prediction of Localized Corrosion of Alloy 825 and Type 316L Stainless Steel," *Corrosion*, p. 885 (1993); "The Effect of Nitrogen on the Corrosion of Plasma-Nitrided 4140 Steel," *Corrosion*, 47(1), p. 31 (1991).

Example 1

Evaluation of Organic Acid Corrosion Inhibitors without a Surface Active Agent

Three aluminum specimens were evaluated using the Ford Galvanostatic Pitting Potential Test. The first specimen was the standard aluminum alloy (AA3003) required for the galvanostatic test ("standard specimen"). See Ford Specification BL 5-1. The other specimens were prepared by removing sections from new flux-treated brazed aluminum radiators manufactured by the CAB process; only one of which was exposed to fluoride flux during the brazing process. The surface of the "flux-treated" specimen had a rough, dull surface rich in potassium aluminum fluoride. The surface of the "non-treated" specimen had a smooth, shiny surface typical of aluminum oxide.

Each of these specimens were evaluated using the antifreeze formulations described in Table 1 below:

TABLE 1

| Component | Formulation 1A (without nitrite) | Formulation 1B (with nitrite) |
|---|---|---|
| Ethylene glycol, wt % | 93+ | 93+ |
| TTZ, ppm | 900 | 900 |
| 2-Ethylhexanoic acid, wt % | 3.1 | 3.1 |
| Neo-decanoic acid, wt % | 1.1 | 1.1 |
| $NaNO_2$, ppm | 0 | 4000 |

In addition to the components identified in Table 1, each formulation also contained sodium hydroxide to adjust the pH to between about 8.8 and about 9.0, as well as deionized water (less than 4 vol %).

A comparison of the repassivation potentials (Erep, mV) for each of the specimens tested (for each antifreeze formulation evaluated) is set forth below in Table 2.

TABLE 2

| Specimen | Formulation 1A | Formulation 1B |
|---|---|---|
| Standard | +2700 mV | +2500 mV |
| Non-flux Treated | +4500 mV | +2500 mV |
| Flux-treated | +10 mV | −600 mV |

As shown in Table 2 above, the standard specimen showed no significant change in pitting-corrosion inhibition (i.e., Erep, mV) between antifreeze formulations with and without nitrite. There were, however, significant losses in inhibition of pitting-corrosion by the formulation containing nitrite (1B) compared to those without nitrite (1A) with both non-flux treated and flux-treated radiator specimens.

Moreover, both formulations demonstrated a significant drop in the ability to protect the flux-treated specimen as compared to the non-flux treated specimen. In fact, the formulation with nitrite (1B) did not meet the minimum Ford specifications for this test of −400 mV and thus, would not be expected to adequately protect heat exchangers containing flux treated aluminum.

Example 2

Evaluation of Formulations with $NaNO_3$ as a Corrosion Inhibitor for Standard Aluminum Surfaces Sodium nitrate ($NaNO_3$), known to be an effective pitting-corrosion inhibitor in conventional antifreeze formulations, was evaluated using the Ford Galvanostatic Pitting Potential Test with a standard aluminum specimen, as was used in Example 1. Several antifreeze formulations with organic acid based corrosion inhibitors with varying $NaNO_3$ concentrations ranging from 0 to 4000 ppm were evaluated. The repassivation potentials (Erep, mV) for each of the formulations tested are shown in Table 3.

TABLE 3

| Component | Formulations | | | |
|---|---|---|---|---|
| | 2A | 2B | 2C | 2D |
| Ethylene glycol, wt % | 93+ | 93+ | 93+ | 93+ |
| TTZ, ppm | 900 | 900 | 900 | 900 |
| 2-Ethylhexanoic acid, wt % | 3.1 | 3.1 | 3.1 | 3.1 |
| Neo-decanoic acid, wt % | 1.1 | 1.1 | 1.1 | 1.1 |
| $NaNO_3$, ppm | 0 | 1000 | 2000 | 4000 |
| Erep., mV | +2700 | +1760 | +2000 | +1760 |

As shown in Table 3, the addition of $NaNO_3$ to organic acid based antifreeze formulations reduced the repassivation potential and thus, made these organic acid based antifreeze formulations less effective for protecting aluminum surfaces.

Moreover, as shown in Table 4 below, the addition of $NaNO_3$ to formulations containing $NaNO_2$ did not demonstrate any improvement in pitting-corrosion inhibition.

TABLE 4

| Component | Formulations | | | | |
|---|---|---|---|---|---|
| | 2A | 2E | 2F | 2G | 2H |
| Ethylene glycol, wt % | 93+ | 93+ | 93+ | 93+ | 93+ |
| TTZ, ppm | 900 | 900 | 900 | 900 | 900 |
| 2-Ethylhexanoic acid, wt % | 3.1 | 3.1 | 3.1 | 3.1 | 3.1 |
| Neo-decanoic acid, wt % | 1.1 | 1.1 | 1.1 | 1.1 | 1.1 |
| $NaNO_3$, ppm | 0 | 0 | 1000 | 2000 | 4000 |
| $NaNO_2$, ppm | 0 | 4000 | 4000 | 4000 | 4000 |
| Erep., mV | +2700 | +2500 | +2000 | +2250 | +2000 |

Example 3

Evaluation of Formulations with $NaNO_3$ as a Corrosion Inhibitor for Flux-Treated Aluminum Surfaces The same formulations evaluated in Example 2 were tested on flux-treated aluminum specimens. As shown in Table 5 below, the addition of $NaNO_3$ to antifreeze formulations using organic acid corrosion inhibitors, either with nitrite (formulations 2E–2H) or without (formulations 2A–2D) resulted in an increase in repassivation potential and thus, an enhanced ability to inhibit pitting-corrosion of flux-treated aluminum surfaces. These results are particularly surprising in view of the results in Example 2 where the identical formulations were evaluated for their effectiveness as pitting-corrosion inhibitors for standard aluminum surfaces. Such nitrate-containing formulations (2B–D, 2E–2H) were shown to be less effective in inhibiting pitting-corrosion as compared to those formulations without nitrates (formulations 2A, 2D).

TABLE 5

| Component | Formulations 2A | 2B | 2C | 2D | 2E | 2F | 2G | 2H |
|---|---|---|---|---|---|---|---|---|
| Ethylene glycol, wt % | 93+ | 93+ | 93+ | 93+ | 93+ | 93+ | 93+ | 93+ |
| TTZ, ppm | 900 | 900 | 900 | 900 | 900 | 900 | 900 | 900 |
| 2-Ethylhexanoic acid, wt % | 3.1 | 3.1 | 3.1 | 3.1 | 3.1 | 3.1 | 3.1 | 3.1 |
| Neo-decanoic acid, wt % | 1.1 | 1.1 | 1.1 | 1.1 | 1.1 | 1.1 | 1.1 | 1.1 |
| $NaNO_3$, ppm | 0 | 1000 | 2000 | 4000 | 0 | 1000 | 2000 | 4000 |
| $NaNO_2$, ppm | 0 | 0 | 0 | 0 | 4000 | 4000 | 4000 | 4000 |
| Erep., mV | +10 | +500 | +750 | +1200 | -600 | +500 | +1200 | +1500 |

We claim:

1. A method for inhibiting the corrosion of flux-treated metal surfaces comprising the step of contacting said metal surfaces with an antifreeze coolant formulation comprising:

(a) a liquid alcohol which functions as a freezing point depressant;

(b) from about 0.1% to about 5.5% by weight of a corrosion inhibitor composition comprising (i) one or more mono-carboxylic acids, or salts or isomers thereof, and (ii) from about 50 ppm to about 5000 ppm, based on the antifreeze coolant formulation, of a corrosion inhibiting surface active agent selected from the group consisting of water soluble alkali and alkaline earth metal nitrate salts, and ammonium and amine salts thereof, and mixtures thereof; and (c) from about 10% to about 90% by weight water.

2. The method of claim 1, wherein the corrosion inhibitor composition comprises one or more mono-carboxylic acids selected from the group consisting of saturated and unsaturated, aliphatic and aromatic, mono-carboxylic acids, and alkali and alkaline earth metal, ammonium and amine salts thereof, and mixtures thereof.

3. The method of claim 1, wherein the corrosion inhibitor composition comprises a mixture, said mixture comprises neo-decanoic acid and a major amount of a $C_8$ mono-carboxylic acid component, or salts or isomers thereof.

4. The method of claim 1, wherein the liquid alcohol is selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols, and mixtures thereof.

5. The method of claim 1, wherein the liquid alcohol is selected from the group consisting of ethylene glycol, diethylene glycol, propylene glycol, dipropylene glycol, and mixtures thereof.

6. The method of claim 1, wherein the antifreeze coolant formulation further comprises up to about 5.5% by weight of one or more additional corrosion inhibitors selected from the group consisting of di-carboxylic acids, triazoles, thiazoles, phosphates, borates, silicates, molybdates, and the alkali or alkaline earth metal, ammonium and amine salts thereof.

7. The method of claim 1, wherein the antifreeze coolant formulation further comprises up to about 5.5% by weight of benzotriazole, mercaptobenzothiazole or tolyltriazole.

8. The method of claim 1, wherein the antifreeze coolant formulation further comprises an alkali metal hydroxide in an amount sufficient to adjust the pH of the formulation to from about 6.0 to about 9.5.

9. The method of claim 8, wherein the alkali metal hydroxide is present in an amount sufficient to adjust the pH of the formulation to from about 6.5 to about 9.0.

10. The method of claim 1, wherein the antifreeze coolant formulation further comprises one or more additives selected from the group consisting of anti-foaming agents, dyes, pH buffers, scale inhibitors, and sequestration and dispersion agents.

11. The method of claim 1 wherein the antifreeze coolant formulation comprises from about 25% to about 75% by weight water.

12. The method of claim 1, wherein the antifreeze coolant formulation further comprises from about 0.1% to about 1.0% by weight of one or more alkali, alkaline earth metal, ammonium or amine salts of nitrite.

13. A method for inhibiting the corrosion of flux-treated aluminum or aluminum alloy surfaces comprising the step of contacting said surfaces with an antifreeze coolant formulation comprising:

(a) a liquid alcohol which functions as a freezing point depressant;

(b) from about 0.1% to about 5.5% by weight of a corrosion inhibitor composition comprising (i) one or more mono-carboxylic acids, or salts or isomers thereof, and (ii) from about 50 ppm to about 5000 ppm, based on the antifreeze coolant formulation, a corrosion inhibiting surface active agent selected from the group consisting of water soluble alkali and alkaline earth metal nitrate salts, and ammonium and amine salts thereof, and mixtures thereof; and (c) from about 10% to about 90% by weight water.

* * * * *

UNITED STATES PATENT AND TRADEMARK OFFICE

CERTIFICATE OF CORRECTION

PATENT NO. : 5,925,173
DATED : July 20, 1999
INVENTOR(S) : Frost et al.

It is certified that error appears in the above-identified patent and that said Letters Patent is hereby corrected as shown below:

| Column | Line | Correction |
|---|---|---|
| 6 | 45 | Change "ian" to -- an --. |
| 8 | 63 | Change "2B-D, 2E-2H" to -- 2B-2D, 2F-2H --. |
| 8 | 66 | Change "2A, 2D" to -- 2A, 2E --. |

Signed and Sealed this

Eleventh Day of July, 2000

*Attest:*

Q. TODD DICKINSON

*Attesting Officer*

*Director of Patents and Trademarks*

UNITED STATES PATENT AND TRADEMARK OFFICE

CERTIFICATE OF CORRECTION

PATENT NO. : 5,925,173
DATED : July 20, 1999
INVENTOR(S) : Richard A. Frost et al.

It is certified that error appears in the above-identified patent and that said Letters Patent is hereby corrected as shown below:

Column 8,
Line 55, replace "2E-2H" with -- 2F-2H --.
Line 56, replace "2A-2D" with -- 2B-2D --.

Signed and Sealed this

Eighteenth Day of December, 2001

Attest:

JAMES E. ROGAN

*Attesting Officer*

*Director of the United States Patent and Trademark Office*